May 30, 1933.  W. M. SCHWEICKART  1,912,335
CONTROLLER FOR CONVEYERS OF GRANULAR MATERIALS
Filed Nov. 29, 1929
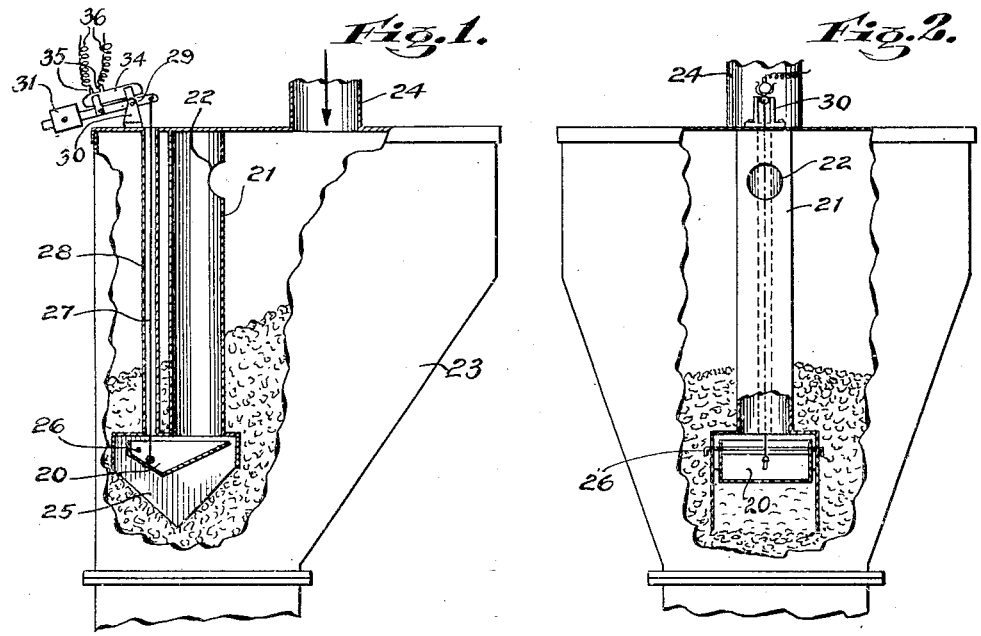
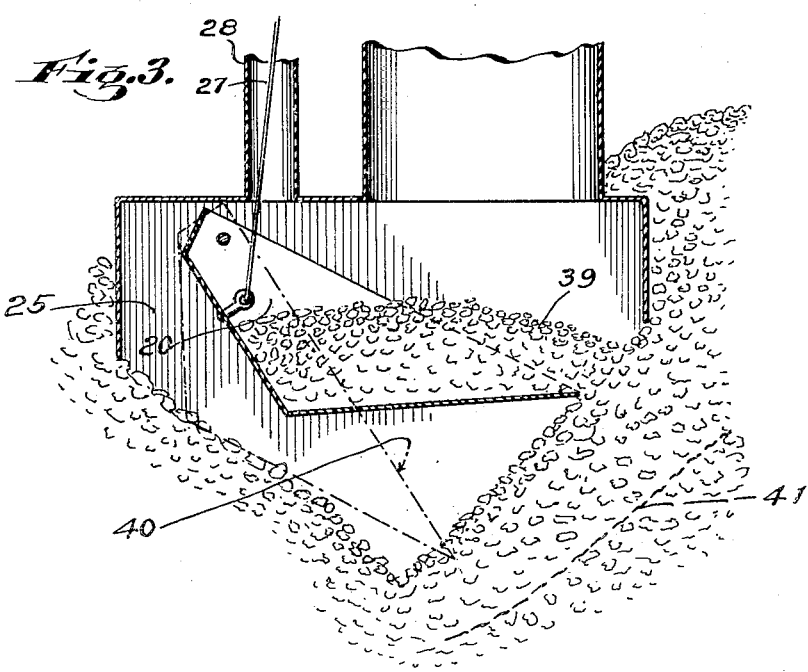
INVENTOR.
William M. Schweickart
BY
ATTORNEYS.

Patented May 30, 1933

1,912,335

UNITED STATES PATENT OFFICE

WILLIAM M. SCHWEICKART, OF RAMSEY, NEW JERSEY, ASSIGNOR, BY MESNE ASSIGNMENTS, TO HENRY M. BROOKS, OF NEW YORK, N. Y., WILLIAM TUDOR GARDINER, OF AUGUSTA, MAINE, AND RICHARD KINGSLEY HAWES, OF FALL RIVER, MASSACHUSETTS, AS TRUSTEES

CONTROLLERS FOR CONVEYERS OF GRANULAR MATERIALS

Application filed November 29, 1929. Serial No. 410,423.

The object of this invention is to provide a mechanism or arrangement for automatically controlling the replenishment of hoppers with granular materials, such as coal, grain, etc.

Herein the term "hopper" is used as including receivers of all kinds where limited amounts of the granular material are to be accumulated from time to time, except as the contrary may appear.

The manner in which the material is supplied to the hopper is not a primary essential of the invention. The supply may be by gravity, there then being, say, simply a valve or other shut-off to stop the gravity flow of the material at the command of the controlling apparatus of the invention, or a conveyer may be used to replenish the hopper, the conveyer being, say, rendered operative and inoperative by the controlling apparatus (as by starting and stopping its driving motor for example), or its flow of material directed alternately to the hopper and elsewhere as the controlling apparatus may direct. The gravity flow or conveyer may or may not deliver directly to the hopper. According to the invention, a movable member or device is so arranged as to receive material when material is supplied to replenish the hopper, and to be displaced by the material it receives, this movable member or device being so related to the hopper that once displaced, the material in the hopper holds the member or device displaced until the hopper is evacuated to the desired degree and by this evacuation loses its control of the movable member or device. The latter then returns to its initial or material-receiving position. On returning to this initial or material-receiving position the movable member or device permits the material-supplier to begin the supply of a new charge for the hopper. By the same or another member or device the supply of material is stopped again when sufficient has been delivered by the material-supplier to recharge the hopper. The whole of each new charge may flow into or over the movable member or device, or only a part of each new charge; if only a part, this part may be a proportional part of the new charge for the hopper, or a part bearing no fixed ratio to the amount of the re-charge, such as a definite fixed amount overflowing to the movable member or device when about the amount of material representing a new charge has been delivered by the supplier.

More specifically, as appears hereinafter, the invention is directed to a device for shielding the movable replenishment controlling member from the new charge until substantially the whole of a new charge has been received and which then permits a part of the new charge to overflow to the movable controlling member, this device being such as not to unduly decrease the cubic contents of the hopper; also it is directed to placing the movement of the movable member under the control of the withdrawal of coal from the hopper to the same end, that is to say, to the end of reducing the space within the hopper occupied by the controlling device as a whole; further, it is directed to the use of a cup-like movable replenishment-controlling member with both the foregoing, to the end of securing positive and reliable operation from the movable member.

In the accompanying drawing, Fig. 1 is a sectional elevation of a form of the invention in which the movable member or device receives only a modicum of the total recharge. Fig. 2 is a sectional elevation at right angles to the illustration of Fig. 1. Fig. 3 is an enlarged showing of the movable member of Fig. 1 and parts adjacent thereto, the movable member being in another position.

For conciseness, I shall hereafter refer to the granular material as "coal", the apparatus illustrated being peculiarly suited for controlling the replenishment of the hoppers of automatic stokers for households with the graded coal such stokers commonly burn.

In the device illustrated, the movable member 20 is a relatively small cup, and is shielded from receiving coal by the substantially vertical tube 21 until the coal overflows through the opening 22, which is so placed that coal overflows therethrough, and down the passage-way provided by the tube 21, when the hopper 23 is nearly filled. A skirt 25 provides an enlargement for the lower end of the tube 21, in which the cup is placed, permitting the use of a conveniently large cup 20 without unnecessarily decreasing the cubic content of the hopper for the full length of the tube. The tube (including the skirt) causes a pocket to be formed in the mass of coal in the hopper as the hopper 23 is filled from above. The cup 20 is pivoted to the skirt or tube walls at 26, and when empty is returned to its upper position illustrated in Fig. 1 by a wire or rod 27, guarded from the coal by a tube 28, this wire or rod 27 going to one end of a lever 29 carried on bracket 30 and having a weight 31 at its opposite end sufficient to restore the cup 20 to its upper position when empty. The pipe 24 supplies the hopper with coal; this delivers directly into the hopper and not directly into tube shield 21. This pipe 24 may be, for example, the conveyer pipe of a pneumatic conveyer, driven by an electric motor. A switch under the control of lever 29, will then serve to control the starting and stopping of the conveyer motor and thereby the supply of coal to the hopper; conveniently such a switch is of the well known type consisting of a glass tube 34 penetrated at one end by two metal terminals 35 and containing a little mercury. These terminals may be respectively connected in the supply circuit 36 of the motor of the pneumatic conveyer. When the lever 29 and tube 34 are in the positions illustrated in Fig. 1, the mercury bridges the terminals 35, thus completing the motor circuit 36 at this point and calling for the supply of further coal to the hopper. On the other hand, when the cup 20 is turned downwardly, and lever 29 thereby turned to its opposite position, the mercury is at the opposite end of the tube, and therefore the motor circuit 36 is open, the conveyer motor is stopped, and no coal is passed over to the hopper.

Starting with the parts in the positions illustrated in Figs. 1 and 2, and with the conveyer in operation furnishing coal to the hopper 23 through the pipe 24: The conveyer may continue in operation until the coal reaches such a height in the hopper 23 that it overflows through the opening 22. When this has occurred to a sufficient extent to substantially fill the cup 20, the latter (now superior to the weight 31) turns downwardly to, say, the position illustrated in full lines in Fig. 3, thus opening the motor circuit at 36 and stopping the further supply of coal to the hopper; the cup 20 is stopped in this position since its length is so related to the length and shape of the skirt 25, that the righthand end of the cup strikes the surface of the coal at the bottom of the pocket formed at the skirt. Obviously this surface of the coal prevents the coal in the cup 20 from escaping from the cup, so that the cup is held in this downward position (and therefore the conveyer is inoperative) until, by withdrawal of coal from the bottom of the hopper 23, the coal surface below the skirt has fallen so low, say to the position indicated by the broken line 41, that the coal in the cup 20 has run out from the cup. When this occurs, the cup will be restored by weight 31 to its upper position of Fig. 1 and thereby the motor circuit reclosed at 35 to bring about the supply of a new charge of coal to the now depleted hopper.

It is preferable that a member disposed as 20 in Figs. 1 to 3, be so arranged as to be moved to its lower position by the weight of such coal as can be accumulated on the member free and clear of the walls (as 21) of the passage leading to it; the response with such an arrangement is more reliable. Furthermore, in order that the construction may be a rugged one and reliable in operation under the varying conditions met with in practice, it is preferable that a member so disposed as 20 shall require some little coal to operate it, say some ounces; hence such a member is preferably given the form of a cup, and preferably the cup is so shaped, for example as illustrated, that it quite or substantially empties itself before returning to its upper position.

It will be understood that the invention is not limited to the details illustrated and described above, except as appears hereinafter in the claims.

What is claimed is:—

1. The combination of a hopper, supply means to replenish the hopper with granular material, a member to receive a load of the granular material when material is supplied by said means to replenish the hopper, said member being movable by the load it receives to a position where it can discharge its load as material is withdrawn from the hopper to the point where replenishment of the hopper is called for and being restored to its load-receiving position when its load has been discharged, a shield to shield said member from granular material until substantially the whole of a new charge of granular material has been delivered by said supply means, and means controlled by said member to start the supply of granular material to the hopper by said supply means when said member returns toward its load-receiving position and to stop the further supply of material to the hopper when said member moves toward its load-discharging position characterized by the fact that said member is a cup hinged to swing in a substantially vertical plane and by the fact that the pivot of the cup is so placed that the discharge end of the cup strikes the surface, of that granular material which has passed underneath the shield, before the cup reaches its lowest position and the discharge end of the cup is thereafter carried farther down by the granular material at said surface as granular material is withdrawn from the hopper.

2. The combination of a hopper, supply means to replenish the hopper with granular material, a member on which granular material is imposed when material is supplied by said means to replenish the hopper, said member being movable downwardly by the granular material superimposed on it and being restored to an upper position when relieved of material previously imposed on it, but being so placed under the thrust of material above it, that it rests against the surface of withdrawable granular material that has passed beneath it before it reaches its lowest position, and hence is carried down by the subsequent withdrawal of granular material from the hopper, and means controlled by said member to start the supply of granular material to the hopper by said supply means when said member returns to an upper position and to stop the further supply of material to the hopper when said member moves to a lower position.

3. The combination of a hopper, supply means to replenish the hopper with granular material, means to provide a pocket within the granular material of the hopper, a member within the hopper, to receive granular material and movable thereby, to control said supply means, and means to provide a passageway, generally of a cross-sectional area less than the horizontal cross-sectional area of the portion of said pocket occupied by said member, to conduct granular material to said pocket and member from a point in said hopper higher than said pocket, said means to provide a pocket being at the lower end of said passageway.

In testimony whereof, I have signed this specification.

WILLIAM M. SCHWEICKART.